United States Patent
Bilinski et al.

(10) Patent No.: US 9,602,609 B2
(45) Date of Patent: Mar. 21, 2017

(54) INCOGNITO MODE IN A MEDIA APPLICATION

(71) Applicant: Google Inc., Mountain View, CA (US)

(72) Inventors: Brandon Bilinski, San Francisco, CA (US); Owen Daniel Otto, Berkeley, CA (US)

(73) Assignee: GOOGLE INC., Mountain View, CA (US)

( * ) Notice: Subject to any disclaimer, the term of this patent is extended or adjusted under 35 U.S.C. 154(b) by 159 days.

(21) Appl. No.: 14/228,282

(22) Filed: Mar. 28, 2014

(65) Prior Publication Data
US 2015/0281383 A1    Oct. 1, 2015

(51) Int. Cl.
*G06F 15/16* (2006.01)
*H04L 29/08* (2006.01)

(52) U.S. Cl.
CPC .............. *H04L 67/22* (2013.01); *H04L 67/02* (2013.01); *H04L 67/20* (2013.01); *H04L 67/306* (2013.01)

(58) Field of Classification Search
CPC ....... H04L 67/22; H04L 67/20; H04L 67/306; H04L 67/02
See application file for complete search history.

(56) References Cited

U.S. PATENT DOCUMENTS

| | | | |
|---|---|---|---|
| 8,402,011 B1* | 3/2013 | Bodenhamer | G06F 17/30896 707/706 |
| 2009/0157795 A1* | 6/2009 | Black | G06Q 10/10 709/203 |
| 2010/0293058 A1 | 11/2010 | Maher et al. | |
| 2012/0185949 A1* | 7/2012 | Phillips | H04L 67/02 726/26 |
| 2012/0198524 A1* | 8/2012 | Celebisoy | H04L 63/168 726/5 |
| 2013/0091540 A1 | 4/2013 | Chen et al. | |
| 2013/0159114 A1* | 6/2013 | Rodriguez | G06Q 30/00 705/14.66 |
| 2013/0167045 A1* | 6/2013 | Xu | H04L 67/22 715/760 |
| 2015/0199523 A1* | 7/2015 | Hamilton | H04L 63/10 726/27 |

OTHER PUBLICATIONS

Squicciarini, Anna C. et al.,"Collective Privacy Management in Social Networks", Track: Security and Privacy / Session: Web Privacy, pp. 521-530, Jan. 1, 2009.

* cited by examiner

*Primary Examiner* — Nam Tran
(74) *Attorney, Agent, or Firm* — Morris & Kamlay LLP

(57) ABSTRACT

Implementations of the disclosed subject matter provide techniques for operating a media application in an incognito mode. A method may include operating a media application in a first mode and providing a first indication of a first user action in the media application to a media application provider. Next, an instruction may be received to operate the media application in a second mode. A second indication of a second user action may be received in the media application and the second user action may be performed. Then, the second indication of the second user action may be discarded without providing the second indication of the second user action to the media application provider.

21 Claims, 4 Drawing Sheets

INCOGNITO MODE IN A MEDIA APPLICATION

BACKGROUND

In general, media applications are typically connected to media service providers via the cloud and, in some cases, to a social network, which can help with media content discovery and allow for better tailoring of a media experience for a particular user. However, there are times when a user may wish to keep his media history and media preferences private from a media service provider, and unlinked to a social network. For example, a user may be a parent and may have children who wish to repeatedly listen to The Wiggles (i.e., children's media content) while operating a media application associated with the parent's account and/or device. Because the user has repeatedly listened to The Wiggles in the media application, a media service provider may recommend media content similar to The Wiggles such as Yo Gabba Gabba, or the media service provider may indicate to the user's connections via a social network that the user's favorite artist is The Wiggles. This may be detrimental to the user if the user does not wish to receive media content recommendations similar to The Wiggles and/or if the user does not wish to provide undesired or inaccurate information about the user's media content preferences to the user's social network.

BRIEF SUMMARY

According to an embodiment of the disclosed subject matter a method may include operating a media application in a first mode and providing a first indication of a first user action in the media application to a media application provider. Next, an instruction may be received to operate the media application in a second mode. A second indication of a second user action may be received in the media application and the second user action may be performed. Then, the second indication of the second user action may be discarded without providing the second indication of the second user action to the media application provider.

An implementation of the disclosed subject matter provides a system including a processor configured to operate a media application in a first mode and provide a first indication of a first user action in the media application to a media application provider. An instruction to operate the media application in a second mode may be received. A second indication of a second user action in the media application may be received and the second user action may be performed. Next, the second indication of the second user action may be discarded without providing the second indication of the second user action to the media application provider.

An implementation of the disclosed subject matter provides a system which includes means for operating a media application in a first mode and means providing a first indication of a first user action in the media application to a media application provider. The system may also include means for receiving an instruction to operate the media application in a second mode and means for receiving a second indication of a second user action in the media application. Next, the system may also include means for performing the second user action, and means for discarding the second indication of the second user action without providing the second indication of the second user action to the media application provider.

Implementations of the disclosed subject matter provide techniques for operating a media application in an incognito mode. The present disclosure provides a feature in a media application that allows a user to take action in the media application such as activating (e.g., play, listen, view, etc.) media content while in an incognito mode without providing an indication of his actions to a media application provider. In particular, with a simple switch to incognito mode, a user can prevent receiving embarrassing, inaccurate or undesirable media content recommendations from a media application provider. Additionally, a user may prevent sharing of embarrassing, inaccurate and/or undesirable media content preferences to his social network. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
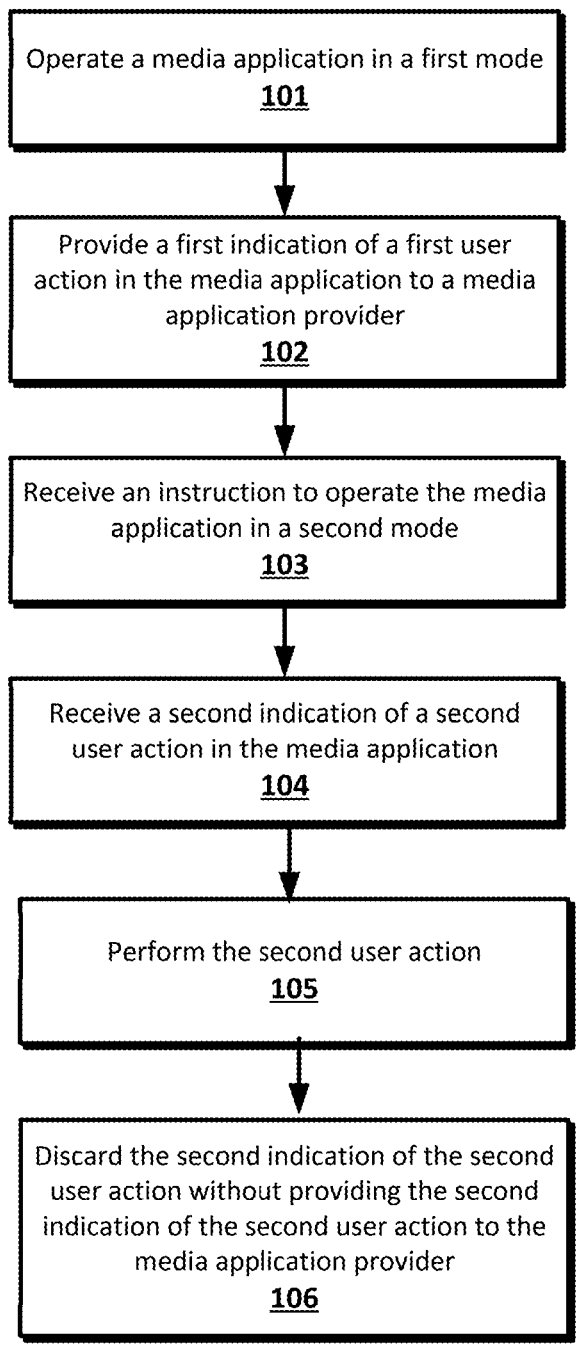
FIG. 1 shows an example process according to an implementation of the disclosed subject matter.

In general, a media application is typically connected to a media application provider which may provide media content to the media application. This media content may be any content that may be activated in a media application such as an album, a song, a movie, a video, a show, a book, a magazine, a playlist, a category of media content, and the like, and media content may be activated by any user action such as playing, selecting, or viewing media content in the media application. In some cases, a media application provider may provide media content suggestions based on a user's actions within a media application. For example, if a user plays a song A, a media service provider may recommend another song B having similar attributes to song A based on the user's action (i.e., playing song A) in the media application. In some cases, a user's actions in a media application may be shared with the user's social network. For example, if a user plays song A by the artist Party Chick multiple times, an indication that the user likes the artist Party Chick may be shared with the user's social network. In general, a user's experience in a media application may be improved when the user receives desirable media content recommendations and when desirable and/or accurate information is shared with a user's social network. In addition, a media application provider may help with media content discovery and allow for better tailoring of a media experience for a particular user. However, there are times when it may be desirable for a user to keep his actions within a media application and/or his media preferences private from a media application provider, and the user may not wish for certain of his actions in a media application to be provided to his social network.

The present disclosure provides an incognito mode feature in a media application that discards a user's action taken within a media application without providing an indication of the user's action to a media application provider. For example, upon operating a media application in an incognito mode, a user action within the media application such as an activation (e.g., playing, listening, viewing, etc.) of media content may not be indicated to a media application provider. For example, a user action taken while the media application is operating in incognito mode may prevent the user action from being stored or used by a media application provider for providing media content recommendations and/or input to the user's social network. According to an implementation, a user may turn on the incognito mode feature on a device causing the device to not send any requests to a media application provider (e.g., requests for media content recommendations, requests to share info via a social network, and the like) except for a request to receive a media content stream. For example, when in incognito mode, the following actions may be disabled: requests to the media application provider to increase play count, requests to post to a social network stream, requests to update the user's media content recommendations and landing screen based on user action taken while in incognito mode, and the like. When in incognito mode, a user's actions such as the user's media activation activity will remain private and, from the perspective of a media application provider, will be as though the user never took those actions such as activation of media content that was activated while in incognito mode.

In addition to an incognito mode, a particular device may be designated as an incognito device. In this case, for example, a user could set a device as incognito such that any actions taken in a media application such as activation of media content on that device may not be indicated to a media application provider. For example, a user action on an incognito device may not be provided to, stored, or used by a media application provider for providing media content recommendations or social network input. As an example, a parent may designate a child's tablet device as an incognito device such that an indication of a user action taken in a media application on the child's tablet device may not be provided to a media application provider. As a result, actions taken on the child's table device such as activation of particular media content may not affect the media content recommendations, received from the media application provider, for the parent's media account. Similarly, an incognito location may be set indicating that once a device is detected at a certain location, user action taken in the media application while the device is located in an incognito location may not be indicated to a media application provider. For example, a user may set his workplace as an incognito location such that once his device is detected at his workplace location, his user actions in the media application will not be indicated to a media application provided. Further, an incognito time period may be set during which incognito mode may be automatically turned on in a media application such that an indication of the user's actions taken in the media application during the incognito time period will not be provided to a media application provider.

Additionally, particular media content and/or category of media content may be designated as incognito. For example, a user may designate certain radio stations, playlists, genres, albums, artists, and the like, as incognito such that a user action associated with incognito media content may not be provided to a media application provider. As in the example above with the parent and child, the parent may designate the artists The Wiggles and Katy Perry as incognito. As a result, indication(s) of user action associated with The Wiggles and/or Katy Perry in a media application may not be provided to a media application provider. For example, no matter how frequently media content from either of these artists is activated, from the perspective of a media application provider, it will appear that the user has never activated media content associated with those artists.

In general, the present disclosure provides a media application that may be operated in an incognito mode. While operating in incognito mode, an indication of a user action taken in the media application may not be provided to a media application provider. FIG. 1 shows an example process according to an implementation of the disclosed subject matter. As shown, a media application may be operated in a first mode, at 101. A media application may be any application for presenting media content and in which a user may take an action. For example, a media application may be an application in which media content may be activated by a user. Media content may be any content that may be presented in a media application such as an album, a song, a movie, a video, a show, a book, a magazine, a playlist, a category of media content, a landing page, a radio station, and the like. A category of media content may be any category in which media content may be categorized such as new releases, recently purchased media content, recommended media content, a library of media content, a playlist, an album, an artist, a radio station, a genre, and the like. A user action in a media application may be any user action that may be taken in a media application such as controlling, searching, deleting, and/or activating media content. Media content may be activated by playing, selecting, or viewing media content or a category of media content in the media application.

A first user action may be performed by the media application, for example, a user may select a song and the song may be played by the media application. Referring back to FIG. 1, a first indication of a first user action in the media application may be provided to a media application provider, at 102. A media application provider may be the provider of a media application and/or media content. In some cases, a media application provider and a media application may be managed by the same entity. As used herein, operation of a media application in a first mode, at 101, may be a mode, for example a "normal" operational mode, in which indications of user actions within the media application are provided to a media application provider. As mentioned above, a media application provider may receive indications of a user's actions in a media application. In some cases, a media application provider may receive, store, and/or use indications of user actions in a media application for various purposes. For example, a media application provider may use an indication of a user action in a media application to provide a recommendation for relevant media content and/or category of media content. A media application provider may also use an indication of a user action to provide input to a social network account associated with a user. When a media application is operating in a "normal" mode, the media application may provide various requests to a media application provider. For example, a media application may request media content, request to increase play count, request to provide input to a social network, request media content recommendations for a user, request a custom landing screen associated with a user, and/or request other content associated with a user (e.g., a preferred radio station, a playlist) from a media application provider. Any other media content, data, and/or information that may be used when operating the media application in "normal" mode may be requested by a media application and/or provided by a media application provider.

An instruction to operate the media application in a second mode may be received at 103. As used herein, operation of a media application in a second mode may be a mode, for example an incognito operational mode, in which indications of user actions within the media application are discarded and are not provided to a media application provider. A second indication of a second user action in the media application may be received, at 104, and the second user action may be performed, at 105. For example, the user may select a particular song to be played, and as a result, the song may be played in the media application. Because the media application is operating in the second mode, i.e., incognito mode, upon receiving the second indication of the second user action, the second indication may be discarded. In particular, the second indication of the second user action may be discarded without providing the second indication to the media application provider, at 106.

An instruction to operate the media application in the second mode may be based on a setting such as a system setting, a default setting, a user setting, and like. In some cases, the instruction to operate in the second mode may be based on a selection received from a user. For example, a user may select to operate a media application in an incognito mode by selecting a portion of an interface in the media application, such as by tapping or clicking on an incognito mode button or icon in the media application or performing a gesture indicating a request to enter incognito mode.

In addition, an instruction to operate in incognito mode may be based on a variety of factors. According to an implementation, an instruction to operate in a second mode may be based on the current time and day. For example, a media application may automatically be instructed to operate in incognito mode during a specific time, day, date, time period, and the like. As an example, a user may wish to automatically turn on incognito mode in a media application every day from 8:00 am to 9:00 am, on Wednesdays from 3:30 pm to 4:30 pm, on Saturdays, and on Mar. 15, 2014. As a result, the media application may automatically receive an instruction to operate in incognito mode when the current time and day satisfies any of these day/time settings. According to an implementation, an instruction to operate in a second mode may be based on the second user action. In some cases, the second user action may be a request for a media content item in a first category of media content. For example, a media application may be instructed to automatically operate in incognito mode when a user action is a request for particular media content in a specific category of media content. As an example, a user may wish to automatically turn on incognito mode in a media application when any song by artist A is activated or when any song in the kids genre is activated. As a result, the media application may automatically receive an instruction to operate in incognito mode when a song by artist A is activated or when a song such as the song Itsy Bitsy Spider (i.e., in the kids genre) is activated.

In some cases, operation of a media application may be associated with a user account which may be associated with a user. Because a media application may be associated with a user account, a media application associated with a particular user account may be operated on multiple different devices. For example, a user, having a user account, may operate a media application on multiple devices such as a smartphone, a tablet, a laptop, a wearable device, a media player, a TV, a set-top box, an e-reader, a PC, and any other device on which a media application may operate. According to an implementation, an instruction to operate in a second mode may be based on a device on which the media application is operating. For example, a media application may be instructed to automatically operate in incognito mode when a user action is received by the media application on a particular device. As an example, a user, such as a parent, may wish to automatically turn on incognito mode in a media application when the media application is being operated on a child's tablet device. As a result, the media application may automatically receive an instruction to operate in incognito mode when any indication of a user action is received in the media application on the child's tablet device. An advantage of this feature is that the user account associated with the parent may not be affected by actions taken by the child on the child's tablet device. For example, media content recommendations associated with the parent's user account may be based on user actions taken by the parent rather than user actions taken by the child. In an implementation, the media application may be operated in the first mode on a first device and in the second mode on a second device. As in the example above, the media application may operate on the parent's smartphone device in a "normal" mode while the media application may operate on the child's tablet device in incognito mode. According to an implementation, a method may also include receiving a location of a device on which the media application is operating, and an instruction to operate in a second mode may be based on the location of the device. For example, a media application may be instructed to automatically operate in incognito mode when the location of the device, on which the media application is operating, is determined to be in a particular location. As an example, a user may wish to automatically turn on incognito mode in a media application when the user is at the gym. As a result, the media application may automatically receive an instruction to operate in incognito mode when the device is determined to be located at the location of the gym. The location of a device may be received based on any positioning technique, geolocation technique, and/or sensor(s) on the device (e.g., GPS, and the like).

As mentioned above, a media application provider may provide various media content, categories of media content, and other data/content to a media application. In some cases, a media application may receive, from the media application provider, one or more media content suggestions based on one or more user actions taken while operating the media application in a "normal" mode. For example, a media activation history associated with a user or user account may be used by a media application provider to recommend media content that the user is likely to enjoy. As an example, while operating a media application in a "normal" mode, the song Eggplant by the artist Taj may be played. Because this user action was taken while operating in "normal" mode, an indication of the user's action playing the song Eggplant by Taj may be provided to a media application provider. As a result, a media application provider may recommend media content having similar attributes (e.g., by the same or similar artist, in the same or similar genre, from the same or similar album, etc.) to the song Eggplant by Taj. On the other hand, while operating a media application in incognito mode, the song Happy by Party Chick may be played. Because this user action was taken while operating in incognito mode, an indication of the user's action playing the song Happy by Party Chick may be discarded and may not be provided to a media application provider. Accordingly, media content recommendations from the media application provider may not be affected by the user's action playing the song Happy by Party Chick.

According to an implementation, a user may view all media content associated with his user account which has been stored and/or used by a media application provider, for example, based on previous indications of user actions provided to the media application provider. In this case, a user may wish to retroactively remove particular media content associated with this account. In this case, the particular media content may be removed and no longer associate with his user account, as if the media application provider never received indications of user action related to the particular media content. In addition, the user may also choose for indications of user actions associated with this particular media content be discarded and not provided to a media application provider. For example, the user may designate the particular media content as incognito as described above.

Figure 2B:
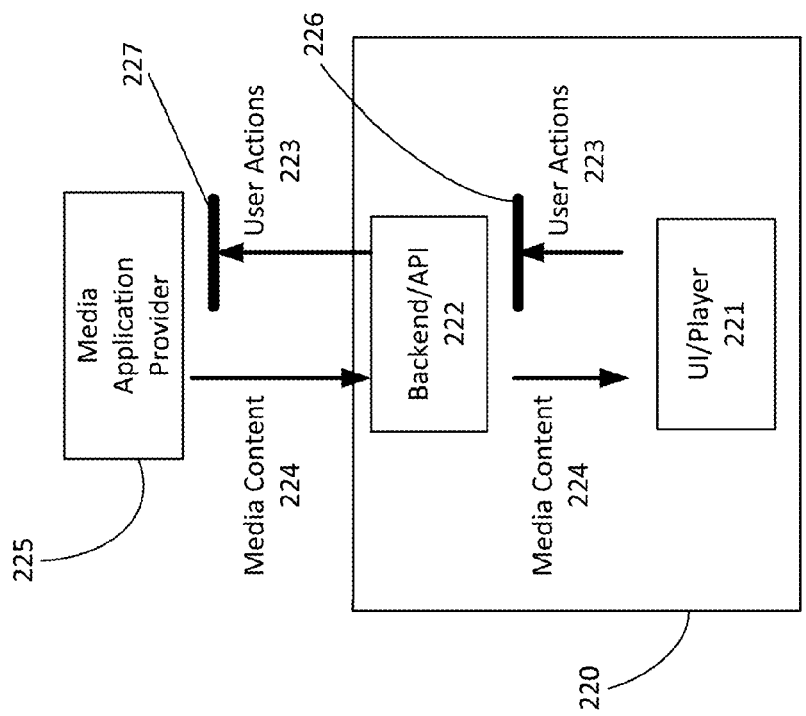
FIGS. 2A and 2B show an example system arrangement according to an implementation of the disclosed subject matter.
Figure 2A:
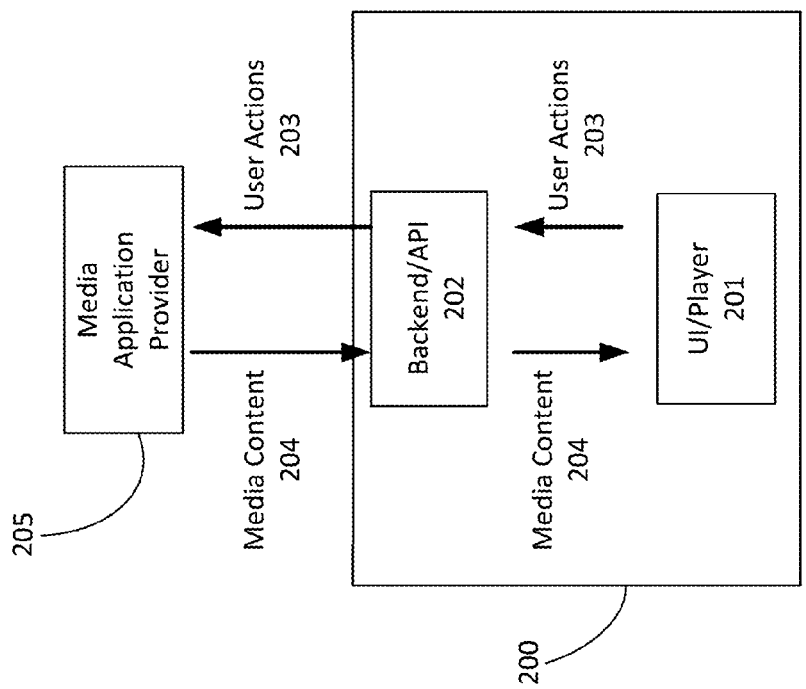

In some cases, the interface in a media application may appear, to a user, the same when operating the media application in normal mode or incognito mode, with the exception of a button or indicator that may indicate if incognito mode is on/off. However, operation of a media application in normal mode or incognito mode may affect the backend operation of the media application, and in some cases, the communication of the media application with a media application provider. In particular, operating a media application in incognito mode may cause indications of user actions to be discarded and not be provided to a media application provider. FIGS. 2A and 2B show an example system arrangement according to an implementation of the disclosed subject matter. In general, FIGS. 2A and 2B each describe the same media application; in particular, FIG. 2A shows the media application operating in a normal mode and FIG. 2B shows the media application operating in incognito mode. As shown in FIG. 2A, a media application 200 operating in normal mode may include a user interface (UI)/media player component 201 and a backend/application programming interface (API) component 202. The media application 200 may communicate with a media application provider 205. The user interface (UI)/media player component 201 may receive indications of user actions 203 and may provide these indications of user actions 203 to the backend/API component 202. As a result, the backend/API component 202 may provide the indications of the user actions 203 to the media application provider 205. The media application provider 205 may provide media content 204 to the backend/API component 202 of the media application 200. Accordingly, the backend/API component 202 may provide the media content 204 to the UI/media player component 201. The media content 204 provided by the media application provider 205 may include various media content, categories of media content, user account settings, and other data/content from a media application provider. For example, the backend/API component 202 may receive media content, media content recommendations, a landing page associated with a user and/or user account, categories of media content (e.g., new releases, recently activated media content, a user's media library, etc.), playlists, radio stations, and the like. In particular, media content may be associated with the specific user and/or user account based on which the media application 200 is operating and may include settings associated with the specific user and/or user account.

As shown in FIG. 2B, a media application 220 operating in incognito mode may include a UI/media player component 221 and a backend/AIP component 222. The media application 220 may communicate with a media application provider 225. Because the media application 220 is operating in incognito mode, indications of user actions 223 may be discarded and may not be provided to the media application provider 225. These indications of user actions 223 may be discarded and may not be provided to the media application provider 225 based on various implementations. For example, indications of user actions 223 received by the media application 220 may be blocked at 226 such that the indications of user actions 223 are discarded and are not provided to the backend/AIP component 222. As a result, indications of user actions 223 may not be provided to the media application provider 225. Alternatively, as another example, indications of user actions 223 received by the media application 220 may be blocked at 227 such that indications of user actions 223 are discarded and are not provided by the backend/AIP component 222 to the media application provider 225. In this case, the backend/AIP component 222 may receive indications of user actions 223 from the UI/media player component 221, and the backend/AIP component 222 may, for example, store these indications 223 but may not provide these indications to the media application provider 225. In some cases, the media application provider 225 may not know that the media application 220 is operating in incognito mode.

According to an implementation, while operating media application 220 in incognito mode, the media application 220 may continue to receive media content 224 from a media application provider 225, as described above with reference to FIG. 2A in normal mode operation. For example, the application provider 205 may provide media content 224 to the backend/API component 222 of the media application 220. Accordingly, the backend/API component 222 may provide the media content 224 to the UI/media player component 221. The media content 224 provided by the media application provider 225 may include various media content, categories of media content, user account settings, and other data/content from a media application provider. For example, the backend/API component 222 may receive media content, media content recommendations, a landing page associated with a user and/or user account, categories of media content (e.g., new releases, recently activated media content, a user's media library, etc.), playlists, radio stations, and the like. In particular, media content may be associated with the specific user and/or user account based on which the media application 220 is operating and may include settings associated with the specific user and/or user account.

A feature of the present disclosure is that, from the perspective of a user and/or a user account associated with the media application 200, 220, the UI/media player component 201, 221 may appear the same whether the media application is operating in normal mode or incognito mode. According to an implementation, during operation in incognito mode, one or more media content suggestions may be displayed in the media application. For example, the media application may continue to receive various media content, categories of media content, user account settings, and other data/content from a media application provider. As another example, during operation in incognito mode, one or more media content suggestions may be displayed in the media application. According to an implementation, one or more media content categories associated with a user account may be received from the media application provider, and the one or more media content categories may be displayed during operation in the second mode, i.e., incognito mode. For example, while operating in incognito mode, media content 224 may continue to be received from the media application provider 225, as it was received from the media application provider 205 while operating the media application 200 in normal mode. Media content 224 which may be received from the media application provider 225 may include media content categories such as media content recommendations, a landing page associated with a user and/or user account, categories of media content (e.g., new releases, recently activated media content, a user's media library, etc.), playlists, radio stations, and the like. As a result, the techniques described herein allow a user of a media application to continue to receive a personalized and tailored media experience even when operating in incognito mode. For example, this may allow a user to continue to receive and access media content associated with the user and/or user account such as a media library associated with the user, playlists associated with the user, preferred radio stations associated with the user, a landing page associated with the user, media content recently activated by the user, media content recently purchased by the user, and any other content and/or settings associated with the user or user account, while operating the media application in incognito mode.

Figure 3:
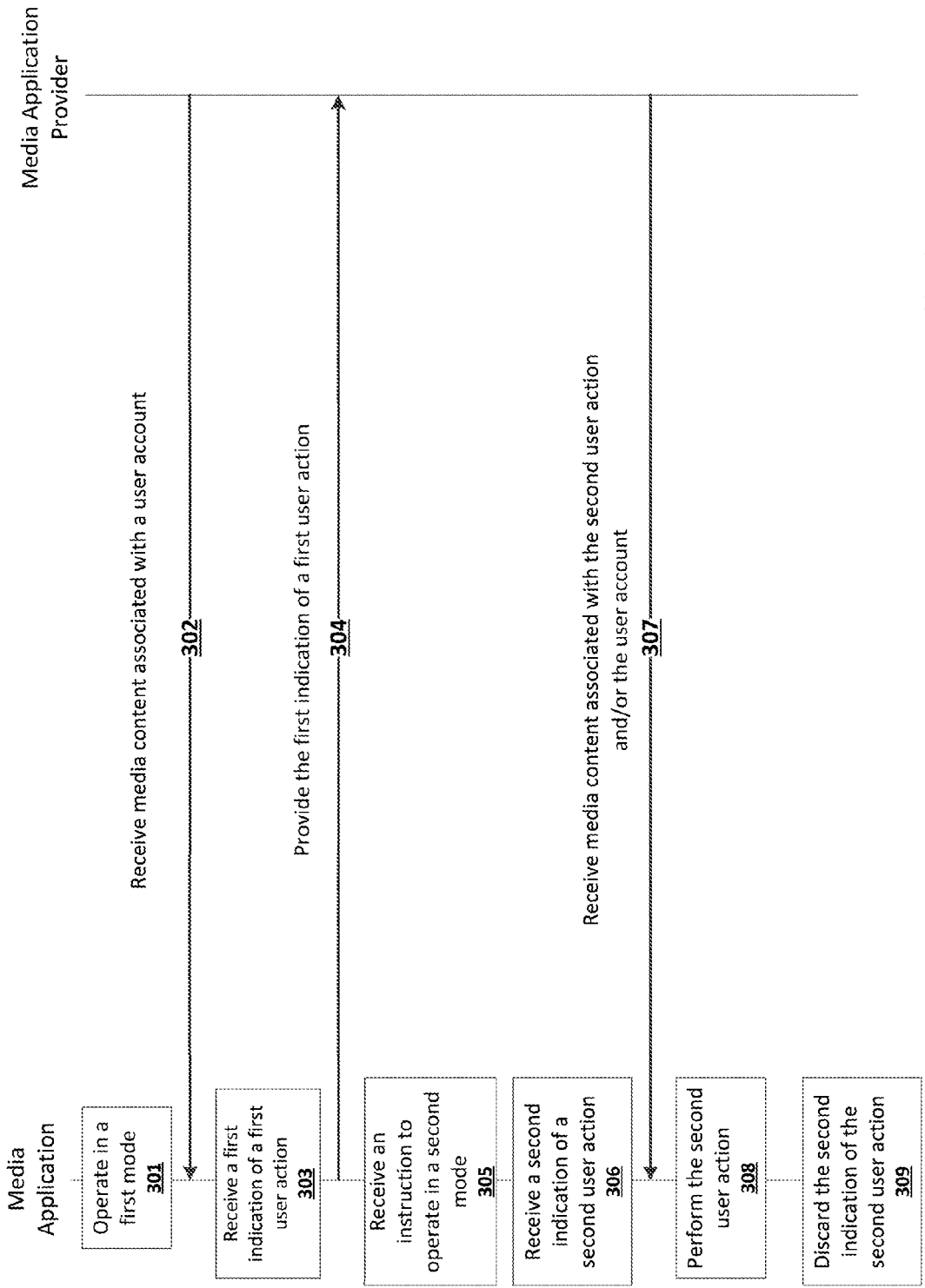
FIG. 3 shows an example information flow according to an implementation of the disclosed subject matter.

Techniques disclosed herein may be implemented according to various system arrangements. FIG. 3 shows an example information flow according to an implementation of the disclosed subject matter. As shown, a media application may operate in a first mode, such as a normal mode, at 301. Operation of the media application in normal mode may include receiving media content associated with a user account from a media application provider, at 302. The media application may receive a first indication of a first user action, at 303, and the media application may perform the first user action. The media application may provide the first indication of the first user action to the media application provider, at 304. The media application may receive an instruction to operate in a second mode, such as an incognito mode, at 305. While operating in incognito mode, the media application may receive a second indication of a second user action, at 306, and the media application may receive media content associated with the second user action and/or the user account, at 307. For example, the second user action may be a request to play the song Pink Pillow, in which case, the media application provider may provide the song Pink Pillow to the media application. In addition, the media application provider may provide media content associated with the user account to the media application such as media content recommendations, a landing page associated with a user and/or user account, categories of media content (e.g., new releases, recently activated media content, a user's media library, etc.), playlists, radio stations, and the like. Following receipt of media content from the media application provider, the media application may perform the second user action, at 308. For example, the media application may play the song Pink Pillow. Because the media application is operating in incognito mode, the second indication of a second user action received at 306, may be discarded by the media application at 309.

In an implementation, the communication between a media application and media application provider may be across one or more bridges between the interfaces. For example, the communications between the media application and the media application provider may be managed or assisted by a third device, such as, a coordinating device, a local coordinator, a remote server, etc. In such cases, the third device may, for example, receive media content from the media application provider and provide the media content to the media application. The third device may also receive indications of user actions from the media application and provide the indications to the media application provider. The third device may also receive an indication that a media application is operating in incognito mode, in which case, the third coordinating device may receive an indication of a user action and may discard the indication without providing it to the media application provider. Furthermore, more than one intermediate device may be implemented to facilitate communication between the devices, one or more media applications and a media application provider.

As described herein, implementations of the disclosed subject matter provide techniques for operating a media application in an incognito mode. The present disclosure provides a feature in a media application that allows a user to take action in the media application such as activating (e.g., play, listen, view, etc.) media content while in an incognito mode without providing an indication of his actions to a media application provider. In particular, with a simple switch to incognito mode, a user can prevent receiving embarrassing, inaccurate or undesirable media content recommendations from a media application provider. Additionally, a user may prevent embarrassing, inaccurate or undesirable sharing of his media content activation history to his social network. Even while operating in incognito mode, the user may still receive the same media content associated with his user account as he would receive while operating in a normal mode. As a result, the user may still enjoy a personalized media experience in a media application but without providing indications of his actions in the media application to a media application provider while in incognito mode.

Figure 4:
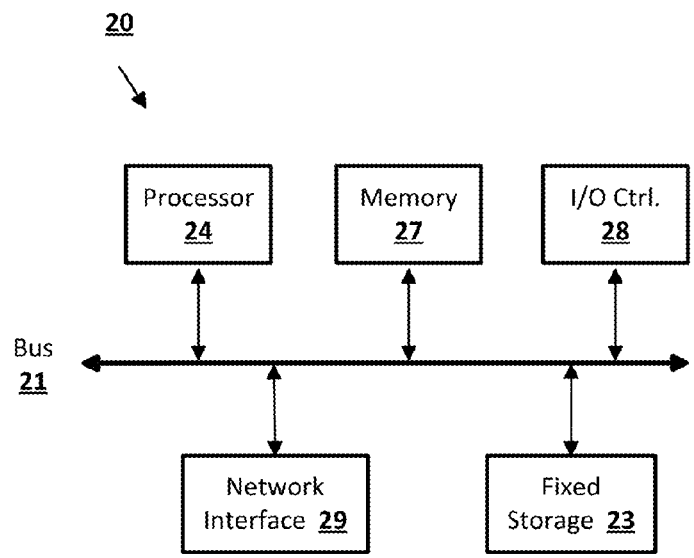
FIG. 4 shows a computer according to an embodiment of the disclosed subject matter.

Embodiments of the presently disclosed subject matter may be implemented in and used with a variety of component and network architectures. FIG. 4 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 5.

Many other devices or components (not shown) may be connected in a similar manner, such as document scanners, digital cameras, auxiliary, supplemental, or backup systems, or the like. Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 5:
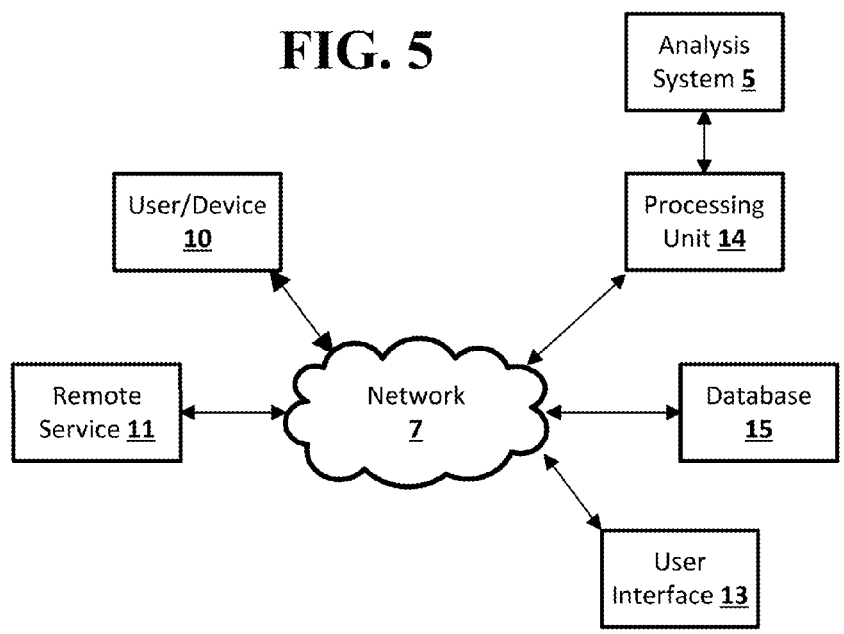
FIG. 5 shows a network configuration according to an embodiment of the disclosed subject matter.

FIG. 5 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as CD-ROMs, DVDs, hard drives, USB (universal serial bus) drives, flash drives, or any other non-transitory machine readable storage medium, such that when the computer program code is loaded into and executed by a computer, the computer becomes an apparatus for practicing embodiments of the disclosed subject matter. Embodiments also may be embodied in the form of computer program code, for example, whether stored in a non-transitory storage medium, loaded into and/or executed by a computer. When the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information, as previously described. The memory or other storage medium may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   operating a media application in a first mode on a first device, the operating including playing a first media file;
   providing, to a media application provider, a first indication of a first user action in the media application regarding the first media file;
   receiving an instruction to operate the media application in a second mode, the instruction being triggered based on the media application operating on a second device designated by a user, the second device being different from the first device;
   receiving a second indication of a second user action in the media application regarding a second media file;
   performing the second user action; and discarding the second indication of the second user action without providing the second indication of the second user action to the media application provider, wherein the first indication and the second indication each correspond to at least one of a play count increase or an input to a social network.

2. The method of claim 1, further comprising performing the first user action prior to the step of receiving an instruction to operate the media application in a second mode.

3. The method of claim 1, further comprising receiving, from the media application provider, one or more media content suggestions based on the first user action.

4. The method of claim 3, wherein the one or more media content suggestions are displayed during operation in the second mode.

5. The method of claim 1, further comprising receiving, from the media application provider, one or more media content categories associated with a user account, and displaying the one or more media content categories during operation in the second mode.

6. The method of claim 1, wherein the instruction to operate in the second mode is further based on selecting a portion of an interface in the media application.

7. The method of claim 1, wherein the instruction to operate in the second mode is based on a setting selected from the group consisting of: a system setting and a default setting.

8. The method of claim 1, further comprising receiving a location of a device on which the media application is operating, and wherein the instruction to operate in the second mode is based on the location of the device.

9. The method of claim 1, wherein the instruction to operate in the second mode is based on the current time and day.

10. The method of claim 1, wherein the instruction to operate in the second mode is further based on the second user action, and wherein the second user action is a request for media content in a first category of media content.

11. A system comprising:
a memory configured to store data; and
a processor configured to read the data from the memory and further configured to:
operate a media application in a first mode on a first device, the operating including playing a first media file;
provide, to a media application provider, a first indication of a first user action in the media application regarding the first media file, the first indication corresponding to at least one of a play count increase or an input to a social network;
receive an instruction to operate the media application in a second mode, the instruction being triggered based on the media application operating on a second device designated by a user, the second device being different from the first device;
receive a second indication of a second user action in the media application regarding a second media file;
perform the second user action; and
discard the second indication of the second user action without providing the second indication of the second user action to the media application provider.

12. The system of claim 11, further comprising performing the first user action prior to the step of receiving an instruction to operate the media application in a second mode.

13. The system of claim 11, further comprising receiving, from the media application provider, one or more media content suggestions based on the first user action.

14. The system of claim 13, wherein the one or more media content suggestions are displayed during operation in the second mode.

15. The system of claim 11, further comprising receiving, from the media application provider, one or more media content categories associated with a user account, and displaying the one or more media content categories during operation in the second mode.

16. The system of claim 11, wherein the instruction to operate in the second mode is further based on selecting a portion of an interface in the media application.

17. The system of claim 11, wherein the instruction to operate in the second mode is based on a setting selected from the group consisting of: a system setting and a default setting.

18. The system of claim 11, further comprising receiving a location of a device on which the media application is operating, and wherein the instruction to operate in a second mode is based on the location of the device.

19. The system of claim 11, wherein the instruction to operate in a second mode is based on the current time and day.

20. The system of claim 11, wherein the instruction to operate in the second mode is further based on the second user action, and wherein the second user action is a request for media content in a first category of media content.

21. A method comprising:
operating a media application in a first mode on a first device;
providing a first indication of a first user action in the media application to a media application provider;
receiving an instruction to operate the media application in a second mode, the instruction being triggered based on the media application operating on a second device designated by a user, the second device being different from the first device;
receiving a second indication of a second user action in the media application;
performing the second user action; and
discarding the second indication of the second user action without providing the second indication of the second user action to the media application provider.

* * * * *